(12) United States Patent
Lee et al.

(10) Patent No.: US 8,340,596 B2
(45) Date of Patent: Dec. 25, 2012

(54) SIGNAL TRANSMISSION APPARATUS AND METHOD USING EIGEN ANTENNA TECHNIQUE IN WIRELESS COMMUNICATION SYSTEM

(75) Inventors: Yong Hwan Lee, Seoul (KR); Jae Yun Ko, Anyang (KR)

(73) Assignee: SNU R&DB Foundation, Seoul (KR)

( * ) Notice: Subject to any disclaimer, the term of this patent is extended or adjusted under 35 U.S.C. 154(b) by 99 days.

(21) Appl. No.: 13/058,698

(22) PCT Filed: Aug. 6, 2009

(86) PCT No.: PCT/KR2009/004387
§ 371 (c)(1),
(2), (4) Date: Mar. 15, 2011

(87) PCT Pub. No.: WO2010/018947
PCT Pub. Date: Feb. 18, 2010

(65) Prior Publication Data
US 2011/0159825 A1 Jun. 30, 2011

(30) Foreign Application Priority Data
Aug. 11, 2008 (KR) .................. 10-2008-0078258

(51) Int. Cl.
*H04B 1/02* (2006.01)
(52) U.S. Cl. .......... 455/91; 455/273; 455/101; 455/125; 455/121; 455/562.1; 375/147; 375/347; 375/348; 375/349
(58) Field of Classification Search .............. 455/91, 455/273, 101, 125, 121, 562.1; 375/147, 375/347, 348, 349
See application file for complete search history.

(56) References Cited

U.S. PATENT DOCUMENTS

| | | | |
|---|---|---|---|
| 7,061,969 B2 * | 6/2006 | Alamouti et al. | 375/147 |
| 7,907,689 B2 * | 3/2011 | Walton et al. | 375/347 |
| 8,223,862 B2 * | 7/2012 | Al-Naffouri et al. | 375/260 |
| 2004/0013180 A1 | 1/2004 | Giannakis et al. | |
| 2010/0330946 A1 * | 12/2010 | Akkarakaran et al. | 455/273 |

FOREIGN PATENT DOCUMENTS

| | | |
|---|---|---|
| JP | 2006-324787 A | 11/2006 |
| KR | 10-2001-0076252 A | 8/2001 |
| KR | 10-2002-0037635 A | 5/2002 |
| KR | 10-2005-0105489 A | 11/2005 |
| KR | 10-2006-0028989 A | 4/2006 |

OTHER PUBLICATIONS

International Search Report for PCT/KR2009/004387 filed on Aug. 6, 2009. Written Opinion of the International Searching Authority for PCT/KR2009/004387 filed on Aug. 6, 2009.

* cited by examiner

*Primary Examiner* — Sanh Phu

(57) ABSTRACT

Disclosed are a signal transmission apparatus and method using a eigen antenna technique in a wireless communication system. The signal transmission apparatus according to one embodiment of the present invention relates to a signal transmission apparatus using a eigen antenna technique in a wireless communication system furnished with a plurality (N) of antennae, comprising: an antenna correlation estimate part that estimates correlation information among the antennae based on a signal received in a reverse channel; a group separation part that separates the plurality of antennae into antenna groups corresponding to the number (M) of transmission signals based on the estimated correlation information among the antennae and provides the information on the separated antenna groups; a gain adjustment part that adjusts the gain of each group antenna included in the antenna group based on the separated antenna group information; and a signal transmission part that transmits the pertinent signal via the antenna group for which the gain of the individual group antenna has been adjusted.

15 Claims, 3 Drawing Sheets

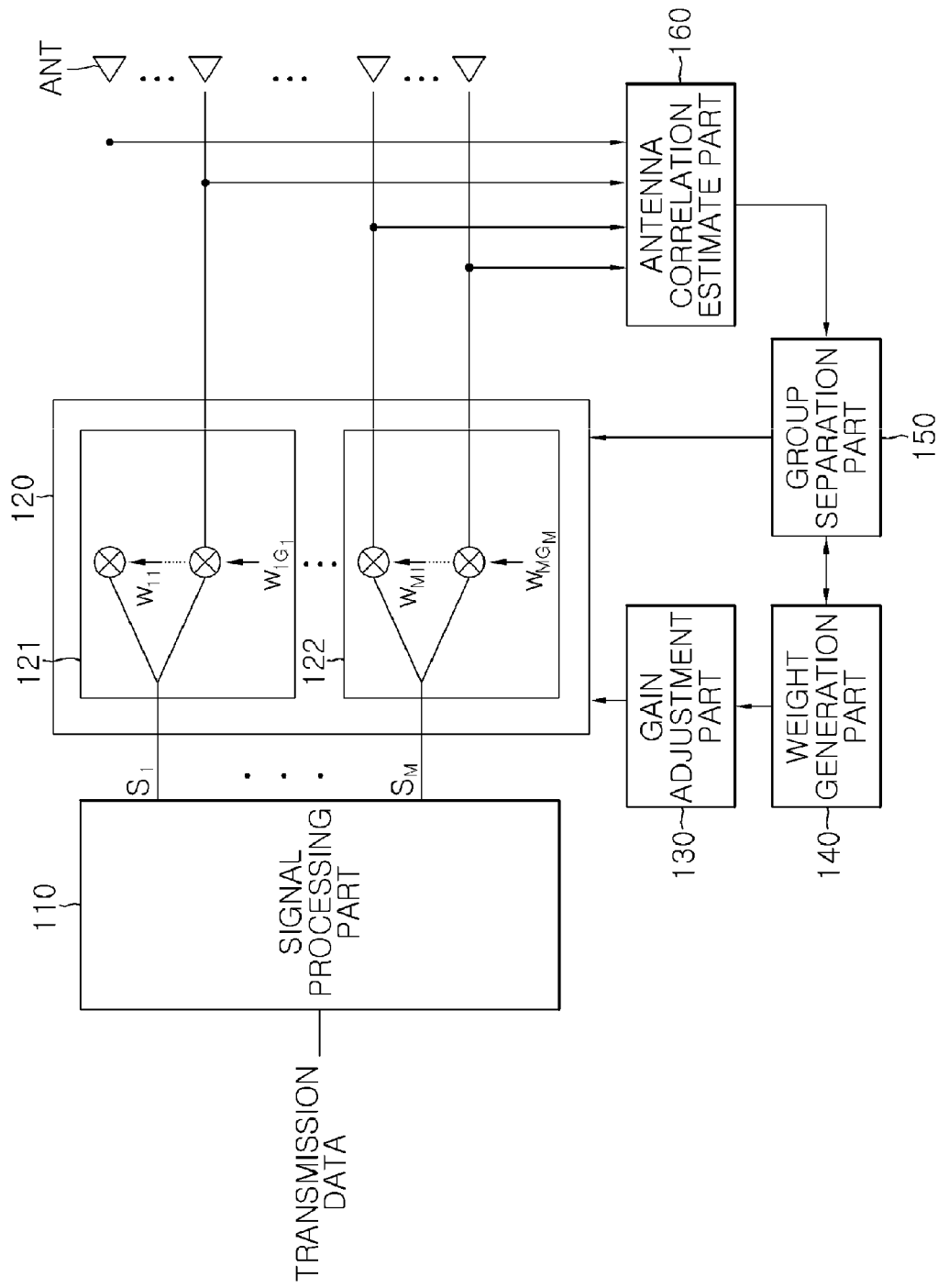

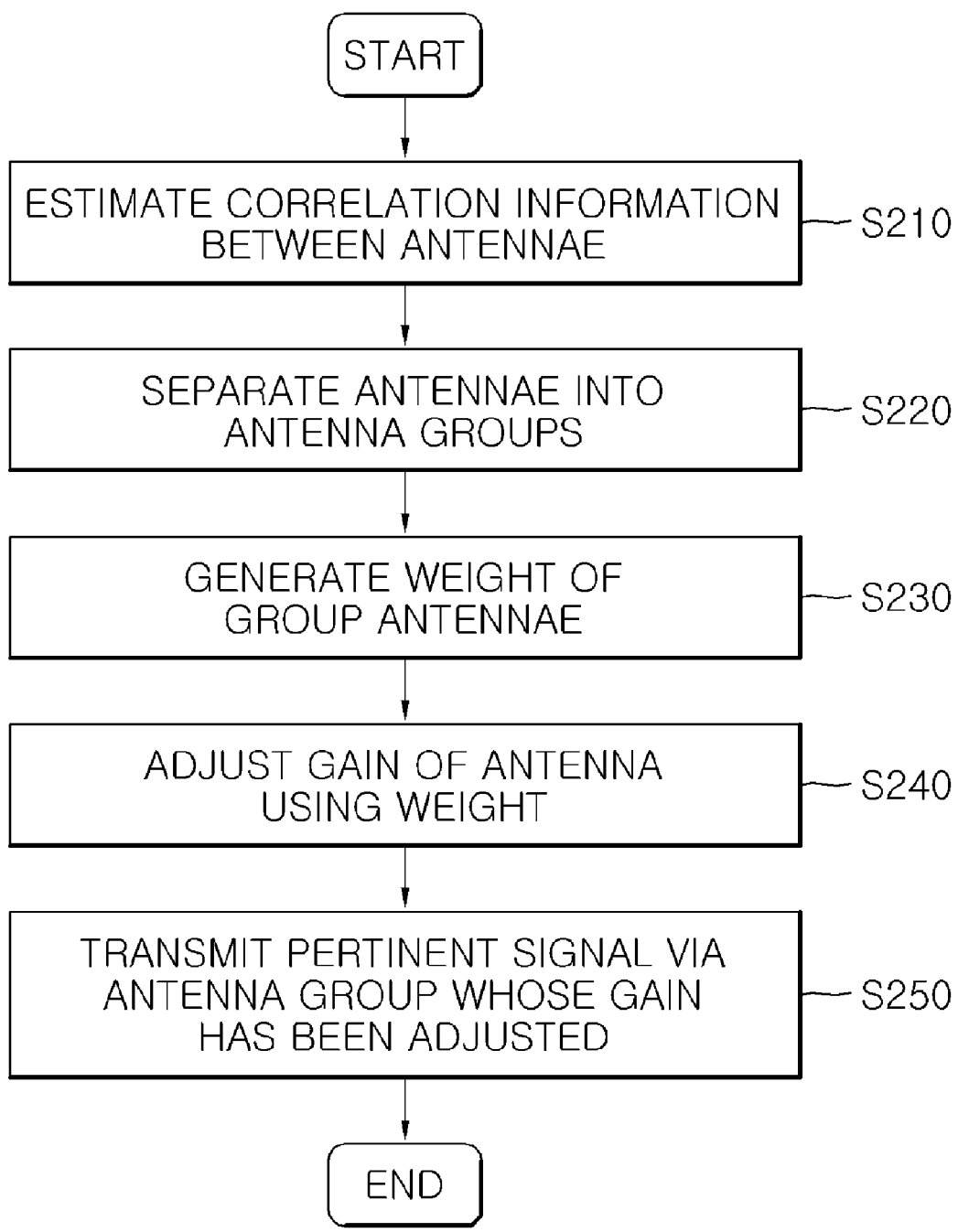

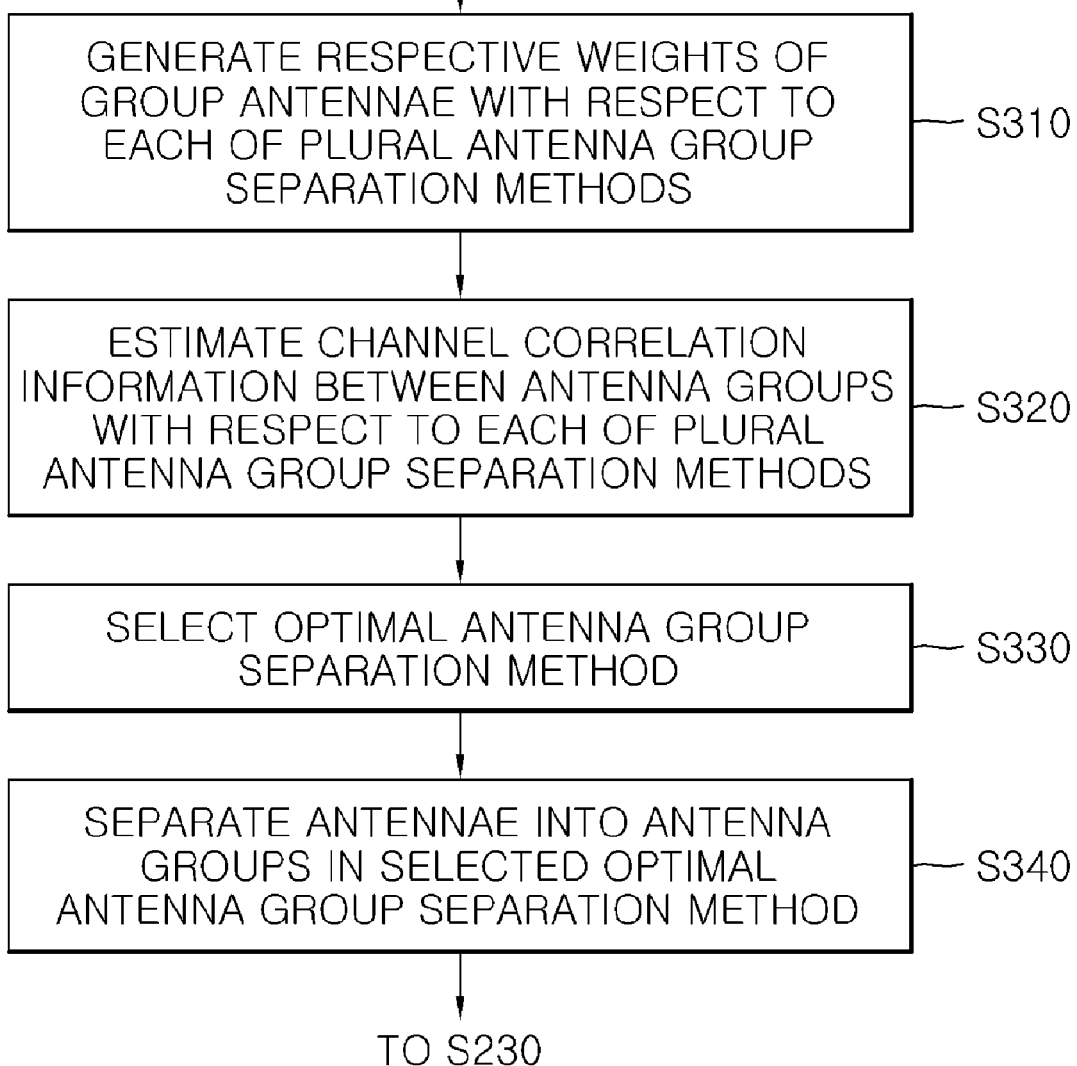

SIGNAL TRANSMISSION APPARATUS AND METHOD USING EIGEN ANTENNA TECHNIQUE IN WIRELESS COMMUNICATION SYSTEM

BACKGROUND OF THE INVENTION

1. Field of the Invention

The present invention relates to signal transmission using a eigen antenna technique, and more particularly, to a signal transmission apparatus using a eigen antenna technique capable of improving quality of a down link signal using residual antennae in a wireless communication system using more antennae than the number of transmission signals and a method thereof.

2. Description of the Related Art

When a signal is transmitted using a plurality of antennae in a wireless communication system, a capacity of a system may be increased. In particular, a Bell Lab. Layered Space-Time (BLAST) scheme capable of acquiring a multiplexing gain, a Space-Time Block Coding (STBC) capable of acquiring a diversity gain, and a beam-forming scheme capable of acquiring power of a received signal may be included in a representative time-space signal processing scheme using a multiple antenna.

In an existing wireless communication system, a transmitter needs M antennae to transmit M transmission signals when there are M time-space signal processed signals. However, when there are N (>M) antennae, M antennae are fixedly selected and used from the N antennas. For example, there are four antennas for a base station in a case of a Wireless Broadband (WiBro) system. However, only one or two antennas may be used to transmit a signal during a down link interval. When there are transmission antennae more than the number of required transmitted signals, an adaptive use of residual antennae may improve quality of a received signal. Channel information for adaptively using the residual antennas may be estimated by a receiver and transmitted to a transmitter.

However, since the method of the related art needs an additional feedback channel, it should correct communication protocols. A receiver has a burden to transmit N-M separate pilot signals to estimate channel information for the residual antennae. This also causes correction of the communication protocols.

SUMMARY OF THE INVENTION

The present invention has been made in view of the above problems, and provides a signal transmission apparatus using a eigen antenna technique capable of improving quality of a down link signal using residual antennae in a wireless communication system using antennae more than the number of transmission signals, and a method thereof.

The present invention further provides a signal transmission apparatus capable of transmitting a transmission signal through a eigen antenna technique using residual antennae without correction of communication protocols, and a method thereof.

In accordance with an aspect of the present invention, a signal transmission apparatus using a eigen antenna technique in a wireless communication system furnished with a plurality (N) of antennae, includes: an antenna correlation estimate part that estimates correlation information among the antennae based on a signal received in a reverse channel; a group separation part that separates the plurality of antennae into antenna groups corresponding to the number (M) of transmission signals based on the estimated correlation information among the antennae and provides the information on the separated antenna groups; a gain adjustment part that adjusts the gain of each group antenna included in the antenna group based on the separated antenna group information; and a signal transmission part that transmits the pertinent signal via the antenna group for which the gain of the individual group antenna has been adjusted.

The signal transmission apparatus further comprises a weight generation part generating respective weights of the plurality of antennae based on the correlation information among the antennae, and the gain adjustment part adjusts respective gains of the group antennae based on the weights of the plurality of antennae generated by the weight generation part.

In this case, the weight generation part generate the weight of the group antenna based on a first eigen vector among eigen vectors of a correlation matrix with respect to the antenna group.

In accordance with another aspect of the present invention, a signal transmission method using a eigen antenna technique in a wireless communication system furnished with a plurality (N) of antennae, includes: estimating correlation information among the antennae based on a signal received in a reverse channel; separating the plurality of antennae into antenna groups corresponding to the number (M) of transmission signals based on the estimated correlation information among the antennae and providing the information on the separated antenna groups; adjusting the gain, of each group antenna included in the antenna group based on the separated antenna group information; and transmitting the pertinent signal via the antenna group for which the gain of the individual group antenna has been adjusted.

The signal transmission method further comprises generating respective weights of the plurality of antennae based on the correlation information among the antennae, and adjusting the gain of each group antenna adjusts respective gains of the group antennae based on the weights of the plurality of antennae generated by the weight generation part.

Separating the plurality of antennae into antenna groups estimates the correlation information among the antennae and channel correlation information among antenna groups constructing the respective antenna group separation methods based on the estimated correlation information among the antennae; selecting an optimal antenna group separation method among the antenna group separation methods based on the estimated channel correlation information; and separating the plurality of antennae into antenna groups corresponding to the number (M) of transmission signals in the selected optimal antenna group separation method.

Selecting an optimal antenna group separation method calculates a sum of channel gains based on the channel correlation information estimated with respect to the respective antenna group separation methods, and selects an antenna group separation method where a sum of the calculated channel gains becomes maximal. Selecting an optimal antenna group separation method calculates a matrix equation of a channel correlation matrix based on the channel correlation information estimated with respect to the respective antenna group separation methods, and selects an antenna group separation method where a value of the calculated matrix equation becomes maximal.

BRIEF DESCRIPTION OF THE DRAWINGS

The objects, features and advantages of the present invention will be more apparent from the following detailed description in conjunction with the accompanying drawings, in which:

FIG. 1 is a block diagram illustrating a configuration of a signal transmission apparatus using a eigen antenna technique according to an embodiment of the present invention;

FIG. 2 is a flowchart illustrating a signal transmission method using a eigen antenna technique according to an embodiment of the present invention; and FIG. 3 is a flowchart illustrating an example of step S220 shown in FIG. 2.

DETAILED DESCRIPTION OF EXEMPLARY EMBODIMENTS

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

A signal transmission apparatus using a eigen antenna technique according to an embodiment of the present invention and a method thereof will be described with reference to FIG. 1 to FIG. 3 in detail.

FIG. 1 is a block diagram illustrating a configuration of a signal transmission apparatus using a eigen antenna technique according to an embodiment of the present invention.

Referring to FIG. 1, the signal transmission apparatus includes a signal processing part 110, a signal transmission part 120, a gain adjustment part 130, a weight generation part 140, a group separation part 150, and an antenna correlation estimate part 160.

The signal processing part 110 encodes, modulates, and time-space signal processes transmission data provided from an upper layer. The signal processing part 110 processes most of baseband signals to output M transmission signals $s_1, \ldots, s_M$.

In a system according to the related art, M transmission signals are transmitted through M fixed antennae without separate signal processing. On the other hand, in the present invention, a plurality of antennas are separated into M antenna groups, and the gain of each group antenna included in the group is adjusted, and the pertinent signal is transmitted via the M antenna groups.

The antenna correlation estimate part 160 estimates correlation information among the antennae based on signals received by a plurality (N) of antennae in a reverse channel. Here, the antenna correlation estimate part 160 may estimate correlation information among the antennae using a following equation 1.

$$r_{i,j} = \begin{cases} 1 & \text{if } i = j \\ \dfrac{E\{y_i^* y_j\}}{\sqrt{E\{|y_i|^2\}E\{|y_j|^2\}}} & \text{otherwise} \end{cases} \quad \text{[Equation 1]}$$

where, i and j represent an order of antennae, y represents a signal received by an antenna in a reverse direction channel, * represents a complex transpose, and $r_{i,j}$ represents correlation information between an i-th antenna and a j-th antenna, namely, a correlation degree.

The group separation part 150 separates the plurality of antennae into M antenna groups 121 and 122 corresponding to the number (M) of transmission signals based on the correlation information among the antennae estimated by the antenna correlation estimate part 160.

In this case, the group separation part 150 selects optimal antenna group separation methods from a plurality of stored antenna group separation methods and separates the selected optimal antenna group separation methods into M antenna groups. This will be described in detail later.

Hereinafter, it is assumed that optimal antenna group separation methods are selected and separated into M antenna groups by the group separation part 150.

The group separation part 150 provides the information on the separated antenna groups to the weight generation part 140. Assuming that the number of group antennae included an i-th antenna group among M antenna groups is $G_i$, and an index of a group antenna included in the antenna group is $\pi_i(1), \ldots, \pi_i(G_i)$, a correlation matrix with respect to a group antenna of the i-th antenna group may be expressed by a following equation 2.

$$R_i = \begin{bmatrix} r_{\pi_i(1),\pi_i(1)} & r_{\pi_i(1),\pi_i(2)} & \cdots & r_{\pi_i(1),\pi_i(G_i)} \\ r_{\pi_i(2),\pi_i(1)} & r_{\pi_i(2),\pi_i(2)} & \cdots & r_{\pi_i(2),\pi_i(G_i)} \\ \vdots & \vdots & \ddots & \vdots \\ r_{\pi_i(G_i),\pi_i(1)} & r_{\pi_i(G_i),\pi_i(2)} & \cdots & r_{\pi_i(G_i),\pi_i(G_i)} \end{bmatrix} \quad \text{[Equation 2]}$$

where, $R_i$ denotes a correlation matrix with respect to group antennae of an i-th antenna group, $\pi_i(1)$ denotes an antenna of the highest order among group antennae, and $\pi_i(G_i)$ denotes an antenna of the lowest order among group antennae. For example, when the group antenna of the i-th antenna group is a second antenna, a fifth antenna, . . . , an N-th antenna, the $\pi_i(1)$ may be the second antenna and the $\pi_i(G_i)$ may be the N-th antenna.

As illustrated in the equation 2, the group separation part 150 constructs and provides correlation information with respect to group antennae of the separated antenna groups to the weight generation part 140. That is, the group separation part 150 generates and provides a correlation matrix with respect to M antenna groups to the weight generation part 140.

The weight generation part 140 generates respective weights of group antennae constituting an antenna group based on the correlation matrix with respect to the antenna groups from the group separation part 150.

In this case, the weight generation part 140 may generate respective weights of group antennae through following procedures. The correlation matrix $R_i$ with respect to a group antenna illustrated in the equation 2 may be expressed by a following equation 3.

$$R_i = Q_i \Sigma_i^2 Q_i^* \quad \text{[Equation 3]}$$

where, $Q_i = [q_{i,1}, \ldots, q_{i,G_i}]$ represents an unitary matrix composed of eigen vectors of $R_i$ having the size of $(G_i \times G_i)$, and $\Sigma_i$ represents a diagonal matrix having the size of $(G_i \times G_i)$ that has $(\sigma_{i,1}, \ldots, \sigma_{i,G_i})$ being an eigen value of $R_i$ as an element, which is $\sigma_{i,1} \geq \ldots \geq \sigma_{i,G_i}$.

The weight generation part 140 generates respective weights of group antennae constructing a corresponding antenna group using the equation 3, and the generated weights of the group antennae may be expressed by a following equation 4.

$$\begin{bmatrix} w_{i,1} \\ \vdots \\ w_{i,G_i} \end{bmatrix} = \begin{bmatrix} q_{i,1,1} \\ \vdots \\ q_{i,1,G_i} \end{bmatrix}$$ [Equation 4]

where, $w_{i,1}, \ldots, w_{i,Gi}$ denote weights of group antennae included in an i-th antenna group, $q_{i,1,j}$ denotes a j-th element of $q_{i,1}$.

As illustrated in the equation 4, the weight generation part 140 generates a weight of a group antenna using a first eigen vector among eigen vectors of a correlation matrix with respect to an antenna group.

The gain adjustment part 130 adjusts the gain of each group antenna included in the antenna group by the weight generation part 140 based on the weight of group antennae included in the antenna group generated by the equation 3 and the equation 4.

For example, the gain adjustment part 130 adjusts respective gains of antennas included in an antenna group 121 corresponding to a transmission signal $s_1$ shown in FIG. 1 using respective weights of a group antenna, namely, $w_{11}, \ldots, w_{iGi}$.

The signal transmission part 120 transmits the transmission signal via the antenna group for which the gain of the individual group antenna has been adjusted by the gain adjustment part 130.

That is, the signal transmission part 120 transmits the same transmission signal, for example, $s_1$ to a receiver through a group antenna in which a gain has been adjusted, for example, a group antenna included in the antenna group 121.

As described above, the signal transmission apparatus according to an embodiment transmits a transmission signal using antenna groups separated corresponding to the number (M) of transmission signals to a receiver to thereby improve quality of a down link signal using residual antennae.

The foregoing embodiment has described that the group separation part 150 separates an antenna group using a specific antenna separation method among stored antenna group separation methods by way of example. However, it is preferred to select an optimal antenna group separation method among the antenna group separation groups to separate an antenna group. The following is a description of a procedure selecting an optimal antenna group separation method among a plurality of antenna group separation methods by the group separation part 150. Here, it is assumed that there are M antenna groups.

The group separation part 150 provides a correlation matrix with respect to M antenna groups included in each of the antenna group separation methods and receives feedback of respective weights of group antennae included in an antenna group generated by the weight generation part 140.

For example, assuming that the number of the antenna group separation methods is four, the group separation part 150 provides a correlation matrix with respect to M antenna groups included in a first antenna group separation method to the weight generation part 140 to receive feedback of respective weights of group antennae included in M antenna groups included in the first antenna group separation method.

The group separation part 150 provides a correlation matrix with respect to M antenna groups included in a second antenna group separation method to the weight generation part 140 to receive feedback of respective weights of group antennae included in M antenna groups included in the second antenna group separation method. Such the foregoing procedures with respect to all antenna group separation methods are performed.

Here, a channel vector of group antennae included in an i-th antenna group of each of the antenna group separation methods may be composed by a following equation 5.

$$h_i = \begin{bmatrix} h_{\pi_i(1)} \\ \vdots \\ h_{\pi_i(G_i)} \end{bmatrix} = Q_i \Sigma_i h_w$$ [Equation 5]

where, $h_i$ means a channel vector of an i-th antenna group, and $h_w = [h_{w,1}, \ldots, h_{w,Gi}]^T$ is a vector having independent identically distributed (i.i.d.) Gaussian random variables as an element in which an average is zero and a variance is one, and a superscript T means transpose calculation of a matrix.

In this case, a real channel with respect to an i-transmission signal, namely, $s_i$ including an eigen antenna conversion procedure of the i-th antenna group may be expressed by a following equation 6.

$$h_i' = \sum_{j=1}^{G_i} h_{\pi_i(j)} w_{i,j} = (Q_i \Sigma_i h_w) * q_{i,1} = \sigma_{i,1} h_{w1}^*$$ [Equation 6]

where, $h_i'$ means an estimation channel with respect to a signal transmitted through the i-th antenna group, and an average of $h_i'$ is zero and a variance is identical with $h_i' = \sigma_{i,1}^2 E\{|h_{w1}|^2\} = \sigma_{i,1}^2$.

Through the equation 6, a channel configured by the i-th antenna group may have a gain of $\sigma_{i,1}^2$.

That is, a channel with respect to an antenna group with the eigen antenna conversion procedure has M antennae considering transmission signals $s_1$ to $s_M$ output from the signal processing part 110, and a gain of an i-th antenna is increased by $\sigma_{i,1}^2$. In this case, a channel correlation degree between antenna groups included in a corresponding antenna group separation method may be expressed by a following equation 7.

$$c_{i,j}' = E\{h_i'^* h_j'\} = E\left\{\left(\sum_{l=1}^{G_i} h_{\pi_i(l)} w_{ij}\right) * \left(\sum_{l'=1}^{G_j} h_{\pi_j(l')} w_{j,l'}\right)\right\}$$ [Equation 7]

$$= \begin{cases} \sigma_{i,1}^2 & \text{if } i = j \\ \sum_{l=1}^{G_i} \sum_{l'=1}^{G_j} w_{i,l} w_{j,l'} r_{\pi_1(l),\pi_j(l')}^* & \text{otherwise} \end{cases}$$

where, means a channel correlation degree (correlation information) between the i-th antenna group and the j-th antenna group.

The channel correlation matrix between M antenna groups generated by the foregoing procedures may be expressed by a following equation 8.

$$C'_l = \begin{bmatrix} c'_{1,1} & c'_{2,1} & \cdots & c^1_{1,M} \\ c'_{2,1} & c'_{2,2} & \cdots & c'_{2,M} \\ \vdots & \vdots & \ddots & \vdots \\ c'_{M,1} & c'_{M,2} & \cdots & c'_{M,M} \end{bmatrix}$$ [Equation 8]

where, $C'_l$ denotes a channel correlation matrix between M antenna groups included in a corresponding group separation method, and l denotes an l-th antenna group separation method among the antenna group separation methods.

The group separation part 150 estimates a channel correlation matrix between antenna groups for each of the stored antenna group separation methods expressed by the equation 8, and selects an optimal antenna group separation method using the estimated correlation matrix between antenna groups.

The group separation part 150 may use two ways to select the optimal antenna group separation method. A first way selects an antenna group separation method where a sum of channel gains becomes maximal among the antenna group separation methods, and an optimal antenna group separation may be selected by a following equation 9.

$$l^* = \underset{l \in \Omega}{\mathrm{argmax}}\{tr(C'_l)\}$$ [Equation 9]

where, $\Omega$ means stored antenna group separation methods, l means an antenna group separation method included in $\Omega$, $l^*$ means an index with respect to an optimal antenna group separation method, and $tr(C'_l)$ means a sum of diagonal components of a matrix $C'_l$.

As illustrated in the equation 9, the first way selects an antenna group separation method where a sum of diagonal components $\{\sigma_{l,1}^2, \ldots, \sigma_{M,1}^2\}$ of $C'_l$, namely, a sum of channel gains becomes maximal among antenna group separation methods included in $\Omega$ as an optimal antenna group separation method.

Since the first way increases a power sum of received signals, it may be beneficial in a low signal-to-noise ratio environment.

The second way selects an antenna group separation method where a multiplexing gain of a channel becomes maximal among the antenna group separation methods. In this case, the optimal antenna group separation method may be selected by a following equation 10.

$$l^* = \underset{l \in \Omega}{\mathrm{argmax}}\{\det(C'_l)\}$$ [Equation 10]

As illustrated in the equation 10, the second way selects an antenna group separation method where a value of a maximum matrix equation of a correlation matrix $C'_l$ of a channel becomes maximal with an eigen conversion procedure among antenna group separation methods included in $\Omega$ as an optimal antenna group separation method.

Since the second way may maximize a channel correlation matrix equation between antenna groups to maximize a multiplexing gain of a time-space channel, it may be beneficial in a low signal-to-noise ratio environment.

As described above, the group separation part 150 may select an optimal antenna group separation method using the equation 9 or the equation 10 according to a wireless communication environment to separate antennae into antenna groups corresponding to a transmission signal. The group separation part 150 is not limited to selection of an optimal antenna group separation by the two ways. However, a person having ordinary skill in the art will know that various ways capable of the optimal antenna group separation method are applicable.

As illustrated in a signal transmission apparatus according to an embodiment of the present invention, since the present invention have no protocols that a transceiver should know in common in a conversion procedure of an eigen antenna and only a transmitter performs the conversion procedure based on a signal received in a reverse channel, it is applicable to an existing system without correcting or adding communication protocols. In particular, when the present invention is applicable to a cellular down link environment including one transmitter (e.g., base station) and a plurality of receivers (e.g., terminal), it may operates only by correction of base station equipment without additional complex or correction of a terminal to be significantly efficient.

Further, the present invention may increases a channel gain using residual antennae to improve quality in a down link signal.

The present invention is firstly applicable to a Time Division Duplexing (TDD) system with the same correlation information of forward and reverse direction channels. Because an interval between forward and reverse frequencies is not large in a Frequency Division Duplexing (FDD) system, the prevent invention is applicable to a case where correlation information of a reverse direction antenna and correlation information of a forward antenna. Moreover, a person having ordinary skill in the art may anticipate that the present invention is applicable a case where the correlation information of the forward antenna is exactly estimated using the correlation information of the reverse direction antenna through a predetermined signal processing procedure in the FDD system.

FIG. 2 is a flowchart illustrating a signal transmission method using a eigen antenna technique according to an embodiment of the present invention.

Referring to FIG. 2, the signal transmission method estimates correlation information between plural antennae based on a reverse channel signal received by a plurality (N) of antennae, namely, a signal received from the receiver (S210).

In this case, the correlation information between plural antennae may be estimated by the foregoing equation 1.

A group separation part separates the plurality of antennae into antenna groups corresponding to the number (M) of transmission signals based on the correlation information among the antennae estimated in step S210 (S220).

When the antennae are separated into the M antenna groups, a weight generation part generates respective weights of group antennae including an antenna group based on correlation information with respect to separated antennae groups (S230).

That is, as illustrated in the equation 2, the weight generation part generates respective weights of group antennae as illustrated in the equation 4 through a procedure of the equation 3 based on the correlation information with respect to the antennae groups.

A gain adjustment part adjusts the respective gains of a plurality of antennae, namely, each group antenna included in the antenna group based on the separated antenna group information using the generated weights of group antennae (S240).

A signal transmission part transmits the pertinent signal via the antenna group whose gain has been adjusted (S250).

FIG. 3 is a flowchart illustrating an example of step S220 shown in FIG. 2.

Referring to FIG. 3, a step S220 separating plural antennae into antenna groups generates respective weights of group antennae including the antenna group based on correlation information with respect to the antenna group included in each of plural stored antenna group separation methods (S310).

That is, a weight generation part extracts antenna group separation methods corresponding to the number (M) of transmission signals from a plurality of antenna group separation methods, and generates respective weights of a group antennas in respective methods using correlation information with respect to antenna groups of the extracted antenna group separation methods.

When the respective weights of group antennae for each of the antenna group separation methods are generated, an antenna correlation estimate part estimates channel correlation information between antenna groups based on the generated weights of the group antennae (S320).

In this case, an antenna correlation estimate part may estimate channel information of an antenna group using the equation 6, and estimate channel correlation information between antenna groups using the equation 7 based on the estimated channel information of the antenna group.

The group separation part generates all the antenna group separation methods capable of separating a channel correlation matrix between antenna groups as illustrated in the equation 8 using the estimated channel correlation information between antenna groups into antenna groups corresponding to the number of transmission signals.

The group separation part selects an optimal antenna group separation method among antenna group separation methods using the generated channel correlation matrix between antenna groups (S330).

In this case, the optimal antenna group separation method may be selected using the equation 9 or the equation 10.

That is, to separate antennae into antenna groups such that a sum of channel gains becomes maximal, the group separation part selects the optimal antenna group among a plurality of antenna group separation methods using the equation 9. Meanwhile, to separate antennae into antenna groups such that a multiplexing gain of a channel becomes maximal, the group separation part selects the optimal antenna group among a plurality of antenna group separation methods using the equation 10.

Upon selection of the optimal antenna group separation method, the group separation part separates a plurality of antennae into antenna groups corresponding to the number of transmission signals in the selected method (S340).

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. A signal transmission apparatus using a eigen antenna technique in a wireless communication system furnished with a plurality (N) of antennae, the apparatus comprising:
   an antenna correlation estimate part that estimates correlation information among the antennae based on a signal received in a reverse channel;
   a group separation part that separates the plurality of antennae into antenna groups corresponding to the number (M) of transmission signals based on the estimated correlation information among the antennae and provides the information on the separated antenna groups;
   a gain adjustment part that adjusts the gain of each group antenna included in the antenna group based on the separated antenna group information; and
   a signal transmission part that transmits the pertinent signal via the antenna group for which the gain of the individual group antenna bas been adjusted.

2. The signal transmission apparatus of claim 1, further comprising a weight generation part generating respective weights of the plurality of antennae based on the correlation information among the antennae,
   wherein the gain adjustment part adjusts respective gains of the group antennae based on the weights of the plurality of antennae generated by the weight generation part.

3. The signal transmission apparatus of claim 2, wherein the weight generation part calculates an eigen value with respect to the antenna group based on the correlation information among the group antennae, and generates respective weights with respect to the group antennae based on the calculated eigen value.

4. The signal transmission apparatus of claim 2, wherein the weight generation part generate the weight of the group antenna based on a first eigen vector among eigen vectors of a correlation matrix with respect to the antenna group.

5. The signal transmission apparatus of claim 2, wherein the group separation part estimates the correlation information among the antennae and channel correlation information among antenna groups constructing the respective antenna group separation methods based on the respective weights of the plurality of antennae received with respect to stored antenna group separation methods from the weight generation part, and selects an optimal antenna group separation method among the antenna group separation methods based on the estimated channel correlation information to separate the antenna groups.

6. The signal transmission apparatus of claim 1, wherein the group separation part estimates channel correlation information among antenna groups constructing stored antenna group separation methods based on the estimated correlation information among the antennae; and selects an optimal antenna group separation method among the antenna group separation methods based on the estimated channel correlation information to separate the antenna groups.

7. The signal transmission apparatus of claim 5, wherein the group separation part calculates a sum of channel gains based on the channel correlation information estimated with respect to the respective antenna group separation methods, and selects an antenna group separation method where a sum of the calculated channel gains becomes maximal.

8. The signal transmission apparatus of claim 5, wherein the group separation part calculates a matrix equation of a channel correlation matrix based on the channel correlation information estimated with respect to the respective antenna group separation methods, and selects an antenna group separation method where a value of the calculated matrix equation becomes maximal.

9. A signal transmission method using a eigen antenna technique in a wireless communication system furnished with a plurality (N) of antennae, the method comprising:
   estimating correlation information among the antennae based on a signal received in a reverse channel;
   separating the plurality of antennae into antenna groups corresponding to the number (M) of transmission signals based on the estimated correlation information among the antennae and providing the information on the separated antenna groups;

adjusting the gain of each group antenna included in the antenna group based on the separated antenna group information; and transmitting the pertinent signal via the antenna group for which the gain of the individual group antenna bas been adjusted.

10. The signal transmission method of claim 9, further comprising generating respective weights of the plurality of antennae based on the correlation information among the antennae, wherein adjusting the gain of each group antenna adjusts respective gains of the group antennae based on the weights of the plurality of antennae generated by the weight generation part.

11. The signal transmission method of claim 9, wherein separating the plurality of antennae into antenna groups estimates the correlation information among the antennae and channel correlation information among antenna groups constructing the respective antenna group separation methods based on the estimated correlation information among the antennae;

selecting an optimal antenna group separation method among the antenna group separation methods based on the estimated channel correlation information; and separating the plurality of antennae into antenna groups corresponding to the number (M) of transmission signals in the selected optimal antenna group separation method.

12. The signal transmission method of claim 11, wherein selecting an optimal antenna group separation method calculates a sum of channel gains based on the channel correlation information estimated with respect to the respective antenna group separation methods, and selects an antenna group separation method where a sum of the calculated channel gains becomes maximal.

13. The signal transmission method of claim 11, wherein selecting an optimal antenna group separation method calculates a matrix equation of a channel correlation matrix based on the channel correlation information estimated with respect to the respective antenna group separation methods, and selects an antenna group separation method where a value of the calculated matrix equation becomes maximal.

14. The signal transmission apparatus of claim 6, wherein the group separation part calculates a sum of channel gains based on the channel correlation information estimated with respect to the respective antenna group separation methods, and selects an antenna group separation method where a sum of the calculated channel gains becomes maximal.

15. The signal transmission apparatus of claim 6, wherein the group separation part calculates a matrix equation of a channel correlation matrix based on the channel correlation information estimated with respect to the respective antenna group separation methods, and selects an antenna group separation method where a value of the calculated matrix equation becomes maximal.

* * * * *